United States Patent
Zelig et al.

(10) Patent No.: US 7,133,415 B2
(45) Date of Patent: Nov. 7, 2006

(54) SONET CIRCUIT EMULATION WITH VT COMPRESSION

(75) Inventors: David Zelig, Givatayim (IL); Leon Bruckman, Petah Tikva (IL); Nitzan Kappel, Zoran (IL)

(73) Assignee: Corrigent Systems Ltd., Tel Aviv (IL)

( * ) Notice: Subject to any disclaimer, the term of this patent is extended or adjusted under 35 U.S.C. 154(b) by 1003 days.

(21) Appl. No.: 09/978,342

(22) Filed: Oct. 17, 2001

(65) Prior Publication Data

US 2003/0012188 A1 Jan. 16, 2003

Related U.S. Application Data

(60) Provisional application No. 60/304,369, filed on Jul. 10, 2001.

(51) Int. Cl.
*H04J 3/16* (2006.01)

(52) U.S. Cl. ................................. 370/466; 370/907

(58) Field of Classification Search ............... None
See application file for complete search history.

(56) References Cited

U.S. PATENT DOCUMENTS

| | | | |
|---|---|---|---|
| 6,275,493 B1 | 8/2001 | Morris et al. | |
| 6,604,136 B1 | 8/2003 | Chang et al. | |
| 6,633,566 B1 * | 10/2003 | Pierson, Jr. ............... | 370/395.1 |
| 6,760,775 B1 | 7/2004 | Anerousis et al. | |
| 6,778,496 B1 | 8/2004 | Meempat et al. | |
| 6,831,932 B1 * | 12/2004 | Boyle et al. ................ | 370/539 |
| 6,886,043 B1 | 4/2005 | Mauger et al. | |
| 2001/0033575 A1 * | 10/2001 | Shimamura et al. ........ | 370/419 |
| 2002/0015411 A1 * | 2/2002 | Kataoka et al. ........... | 370/395.6 |
| 2002/0018482 A1 * | 2/2002 | Gotzer ........................ | 370/418 |
| 2002/0093949 A1 * | 7/2002 | Yasue et al. ................ | 370/356 |
| 2002/0176450 A1 | 11/2002 | Kong et al. | |
| 2003/0026298 A1 * | 2/2003 | Bisson et al. ............... | 370/537 |
| 2004/0101303 A1 * | 5/2004 | Williams .................... | 398/58 |
| 2005/0135436 A1 * | 6/2005 | Nigam et al. ............... | 370/907 |

OTHER PUBLICATIONS

Rosen et al., RFC 3031 of the IETF, entitled: "Multiprotocol Label Switching Architecture", Jan. 2001. (Available at www.ietf.org/rfc.html).

Martini, et al., in an IETF Draft Entitled: "Encapsulation Methods for transport of layer 2 Frames over MPLS", May 2001. (Available at: search.ietf.org/internet-drafts/draft-martini-12circuit-encap-mpls-02.txt.).

Martini, et al., Internet Draft, entitled: "Transport of Layer 2 Frames over MPLS", May 2001. (Available at: search.ietf.org/internet-drafts/draft-martini-12circuit-mpls-06.txt.).

(Continued)

*Primary Examiner*—Chau Nguyen
*Assistant Examiner*—Rhonda Murphy
(74) *Attorney, Agent, or Firm*—Ladas and Parry LLP

(57) ABSTRACT

A method for data communications includes receiving a time-division-multiplexed (TDM) input signal on a first circuit, the signal including an input sequence of frames of data, each such frame divided into sections for carrying respective sub-rate payloads. After determining which of the sections are active, such that the data in the sub-rate payloads of the active sections include user data, and which of the sections are inactive, the user data in the active sections are encapsulated into data packets for transmission over a packet network, while omitting from the packets at least some of the data from the inactive sections.

58 Claims, 5 Drawing Sheets

OTHER PUBLICATIONS

Malis, et al., in an IETF draft entitled: "SONET/SDH Circuit Emulation Service Over MPLS (CEM) Encapsulation", Apr. 2001. (Available at: search.ietf.org/internet-drafts/draft-malis-sonet-ces-mpls-04.txt.).

Walter Goralski, "SONET A Guide to Synchronous Optical Network", McGraw-Hill, 1997.

Synchronous Optical Network (SONET) Transport Systems:Common Generic Criteria, Telcordia Technologies, Piscataway, New Jersey, publication GR-253-CORE, Sep. 2000.

U.S. Appl. No. 09/935,970, entitled: Efficient Setup of Label-Switched Connections, filed Aug. 23, 2001.

* cited by examiner

SONET CIRCUIT EMULATION WITH VT COMPRESSION

CROSS-REFERENCE TO RELATED APPLICATIONS

This application claims the benefit of U.S. Provisional Patent Application No. 60/304,369, filed Jul. 10, 2001, which is incorporated herein by reference.

FIELD OF THE INVENTION

The present invention relates generally to communication networks, and specifically to providing circuit emulation services over packet networks.

BACKGROUND OF THE INVENTION

The Synchronous Optical Network (SONET) is a set of standards that define a hierarchical set of transmission rates and transmission formats for carrying high-speed, time-domain-multiplexed (TDM) digital signals. SONET lines commonly serve as trunks for carrying traffic between circuits of the plesiochronous digital hierarchy (PDH) used in circuit-switched communication networks. SONET standards of relevance to the present patent application are described, for example, in *Synchronous Optical Network (SONET) Transport Systems: Common Generic Criteria* (Telcordia Technologies, Piscataway, N.J., publication GR-253-CORE, September, 2000), which is incorporated herein by reference. While the SONET standards have been adopted in North America, a parallel set of standards, known as Synchronous Digital Hierarchy (SDH), has been promulgated by the International Telecommunications Union (ITU), and is widely used in Europe. From the point of view of the present invention, however, these alternative standards are functionally interchangeable.

The lowest-rate link in the SONET hierarchy is the OC-1 level, which is capable of carrying 8000 STS-1 frames per second, at a line rate of 51.840 Mbps. An STS-1 frame contains 810 bytes of data, which are conventionally organized as a block of nine rows by 90 columns. The first three columns hold transport overhead (TOH), while the remaining 87 columns carry the information payload, referred to as the synchronous payload envelope (SPE). The SPE contains one column of payload overhead (POH) information, followed by 86 columns of user data. The POH can begin at any byte position within the SPE capacity of the payload portion of the STS-1 frame. As a result, the SPE typically overlaps from one frame to the next. The TOH of each frame contains three pointer bytes (H1, H2, H3), which are used to indicate where in each frame the POH begins and to compensate for timing variations between the user input lines and the SONET line on which the STS-1 frames are transmitted.

STS-1 frames can efficiently transport the DS-3 level of the PDH, which operates at 44.736 Mbps. The STS-1 frames themselves are not too much larger than DS-3 frames. When PDH signals at rates below DS-3 are to be carried over SONET, the SPE of the STS-1 frame is divided into sections, known as virtual tributaries (VTs), each carrying its own sub-rate payload. The component low-rate signals are mapped to respective VTs, so that each STS-1 frame can aggregate sub-rate payloads from multiple low-rate links. Multiple STS-1 frames can be multiplexed (together with STS-Mc frames) into STS-N frames, for transmission on OC-N links at rates that are multiples of the basic 51.840 Mbps STS-1 rate.

For the purpose of VT mapping, each STS-1 frame is divided into seven virtual tributary groups (VTGs), each occupying 12 columns of the SPE. Within each VTG, four VT sizes are possible:

VT1.5—occupies three columns, each with sufficient bandwidth to transport a DS-1 signal at 1.544 Mbps (i.e., the signal carried on a T-1 line). One VTG can contain four VT1.5 sections.

VT2—four columns, bandwidth sufficient for an E-1 line.

VT3—six columns, bandwidth sufficient for DS-1C.

VT6—twelve columns, bandwidth sufficient for DS-2.

Mapping of the VTs to the columns of the SPE is specified in detail in the above-mentioned Telcordia publication GR-253-CORE, section 3.2.4. It is not necessary that all of the VTs in a STS-1 frame be used to carry lower-rate signals. Unequipped VT sections, i.e. sections that have no service to carry, in the SPE are simply filled with default data. These unequipped sections are assigned a special indication in the VT POH byte V5, bits 5 to 7, known as the "signal label." In SDH systems, STM-1 frames are similarly divided into sub-rate payload sections of different sizes, referred to as TU-11, TU-12 and TU-2.

Circuit emulation services (CES) is a developing technology for transporting SONET and legacy PDH signals over packet networks, such as Internet Protocol (IP) networks. CES allows the network operator to maintain existing TDM service interfaces in a manner transparent to network users, even when the data traffic travels through a core packet network. For example, the CES operator could continue to offer subscribers DS-1 point-to-point service, while within the core network, the DS-1 signals are carried as packets.

One of the most promising methods for use in CES is Multiprotocol Label Switching (MPLS). MPLS is described in detail by Rosen et al., in Request for Comments (RFC) 3031 of the Internet Engineering Task Force (IETF), entitled "Multiprotocol Label Switching Architecture" (January, 2001), which is incorporated herein by reference. This RFC is available at www.ietf.org/rfc.html. In conventional IP routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. The packet receives a short, fixed-length label identifying the FEC to which it belongs. All packets in a given FEC are passed through the network over the same path by label-switching routers (LSRs). Unlike IP routers, LSRs simply use the packet label as an index to a look-up table, which specifies the next hop on the path for each FEC and the label that the LSR should attach to the packet for the next hop.

Since the flow of packets along a label-switched path (LSP) under MPLS is completely specified by the label applied at the ingress node of the path, a LSP can be treated as a tunnel through the network. Such tunnels are particularly useful in network traffic engineering, as well as communication security. MPLS tunnels are established by "binding" a particular label, assigned at the ingress node to the network, to a particular FEC. Multiple tunnels may belong to the same FEC, but each tunnel will have its own label binding.

When IP packets are passed through a MPLS tunnel, the routing label is removed at the egress node, which then simply routes the packet over its next hop using the packet's IP header. There is no need for the label to tell the egress node what to do with the packet, since the existing IP header, which was applied to the packet before it entered the tunnel, provides all of the necessary information. When layer 2 packets, such as Ethernet frames or ATM cells, are sent through a MPLS tunnel, however, the standard layer 2 media access control (MAC) header that brought the packet to the ingress node does not contain all the information that the egress node requires for delivering the packet to its destination. There is thus a need for a label that tells the egress node how to treat the received packet.

In response to this problem, Martini et al. have proposed to add a "virtual connection" label (or VC label) to the stack of labels used in transporting layer 2 packets through MPLS tunnels. This proposal is described in detail in an IETF draft entitled "Encapsulation Methods for Transport of Layer 2 Frames over MPLS" (May, 2001), which is incorporated herein by reference. The same authors also specify label distribution procedures for binding the VC label to the desired tunnel in a further draft entitled "Transport of Layer 2 Frames over MPLS" (May, 2001), which is likewise incorporated herein by reference. The above documents are available on the IETF Web site.

In accordance with the protocol proposed by Martini et al., before initiating the layer 2 service, the MPLS tunnel is established between the ingress and egress nodes. To set up the required VC label binding for the layer 2 service, the ingress node sends a signaling packet to the egress node carrying a group ID and a VC ID. The group ID represents an administrative group of VCs, and is used for administrative operations on the group. The VC ID is used by the layer 2 service endpoints to associate the locally-configured service with the tunnel.

Malis et al. describe the use of MPLS to carry SONET frames, in an IETF draft entitled, "SONET/SDH Circuit Emulation Service Over MPLS (CEM) Encapsulation" (April, 2001), which is incorporated herein by reference. This document is available at search.ietf.org/internet-drafts/draft-malis-sonet-ces-mpls-05.txt. A SONET OC-N signal is terminated at the packet network ingress node, and the SPE is broken into fragments of fixed length. A CEM header is prepended to each fragment, and a MPLS label stack is then pushed on top of the CEM packet. The MPLS label stack includes the VC label as the last label prior to the CEM header, preceded by an optional tunnel label and additional MPLS labels, depending on how the CEM packets are to be transported through the packet network. At the egress node from the packet network, the CEM packet stream is buffered to absorb delay variations, and the data payload is converted back into a SONET TDM signal using the VC label and CEM header information.

The CEM header defined by Malis et al. contains a number of fields that are used at the egress node to reconstruct the SONET frames. A structure pointer in the CEM header indicates the beginning of the STS-1 POH within the CEM packet payload (or a default value if the fragment does not contain the beginning of the POH). The CEM header also contains N and P bits indicating negative and positive adjustments of the TOH pointer in the STS-1 input frames received at the ingress node. These bits are used to advance or delay the SPE at the egress node in order to preserve the SPE timing between the two circuit emulation endpoints, and thus to reduce the chance of buffer underflow or overflow at the receiving side. In addition, the CEM header includes a sequence number (used to correct packet misordering), an optional error correction code (ECC-6) and a D bit that is used to invoke a dynamic bandwidth allocation (DBA) mode. The DBA mode is used optionally to conserve bandwidth on the packet network by avoiding transmission of trivial SPEs during SONET circuit outages and other abnormal conditions.

Other SONET signals and system features, such as VT sub-rate mapping, are not discussed by Malis et al. in the IETF draft. The authors note that the draft can be extended in the future to support VT and lower-speed non-SONET/SDH services.

SUMMARY OF THE INVENTION

It is an object of some aspects of the present invention to provide methods and devices for conserving packet network bandwidth in circuit emulation services (CES).

It is a further object of some aspects of the present invention to provide methods for explicitly supporting VT mapping in CES applied to SONET/SDH signals.

As noted above, when the VTs of a STS-1 frame are not fully populated, the unused sections are filled with default data. It is a waste of resources (particularly bandwidth) of the packet network to transmit the default data. Existing methods of CES, however, convey the full STS-1 payload, without considering its VT structure. Therefore, in preferred embodiments of the present invention, a CES packet transmitter at the edge of a packet network, which receives a SONET input signal, is informed of or automatically detects which VTs in the signal are active. Inactive VTs are assigned a special value, preferably using the signal label bits in byte V5 of the VT payload overhead (POH), indicating that they are "unequipped" or, optionally, "unassigned." The CES transmitter packetizes only the data in the columns of the SPE that belong to the active VTs, while discarding the default data. In this way, when the VT structure is not fully populated, the volume of data transmitted for each STS-1 frame is drastically reduced by comparison with methods known in the art.

A CES packet receiver at the opposite edge of the packet network is likewise informed of the mapping of the active VTs that is to be applied in generating a SONET output signal. The VT mapping in the output signal can optionally be different from that in the input signal, in order to provide a virtual cross-connect functionality, and multiple sources can feed each output SPE. The CES receiver constructs the frames of the SONET output signal according to the mapping of the active VTs, while reinserting default data in the unused VT sections. Preferably, the CES transmitter inserts pointer adjustments for the entire SPE in the header of the CES packets. The CES receiver replays the pointers to adjust the timing either of the whole SPE or of the individual VTs, if the newly-generated SPE timing is locally generated. Alternatively, the individual VT timing adjustments are made in advance by the CES transmitter.

Although preferred embodiments are described herein with reference specifically to treatment of VTs in CES applied to SONET signals, the principles of the present invention may similarly be applied to packetization of sub-rate payloads carried by other sorts of TDM signals, such as SDH signals and high-speed PDH signals.

There is therefore provided, in accordance with a preferred embodiment of the present invention, a method for data communications, including:

receiving a time-division-multiplexed (TDM) input signal on a first circuit, the signal including an input sequence of frames of data, each such frame divided into sections for carrying respective sub-rate payloads;

determining which of the sections are active, such that the data in the sub-rate payloads of the active sections include user data, and which of the sections are inactive; and encapsulating the user data in the active sections into data packets for transmission over a packet network, while omitting from the packets at least some of the data from the inactive sections.

Preferably, the method includes receiving the packets over the packet network, extracting the user data from the packets, and generating an output sequence of the frames of the data for transmission in a TDM output signal over a second circuit, by inserting the extracted user data in selected sections among the sections of the frames in the output sequence. Further preferably, generating the output sequence includes providing a circuit emulation service over the packet network, whereby the user data are transmitted between the first and second circuits in a manner transparent to a sender and a recipient of the data. Typically, the inactive sections include default data, and generating the output sequence of the frames includes inserting the default data in the sections of the frames in the output sequence that are not selected, whereby the sections that are not selected correspond in form to unequipped sections.

In a preferred embodiment, the selected sections of the frames in the output sequence are substantially the same sections as the active sections of the frames in the input sequence. In other preferred embodiments, generating the output sequence of the frames includes assigning at least one of the selected sections of the frames in the output sequence to correspond to at least one of the active sections of the frames in the input sequence, and transferring the user data from the at least one of the active sections to the at least one of the selected sections that corresponds thereto, so as to cross-connect a source link in the first circuit to a recipient link in the second circuit. In one such preferred embodiment, receiving the TDM input signal includes assembling the sections of the frames of the input signal from multiple sources.

Preferably, encapsulating the user data includes inserting into the packets an indication of a timing adjustment to be applied to one or more of the active sections, and generating the output sequence of the frames includes adjusting the user data in at least one of the selected sections responsive to the indication. In a preferred embodiment, adjusting the user data includes applying different timing adjustments to different ones of the selected sections.

In a further preferred embodiment, generating the output sequence of the frames includes sending a plurality of output signals containing the data from different ones of the active sections to different, respective destinations.

Preferably, the first circuit includes one of a Synchronous Optical Network (SONET) link and a Synchronous Digital Hierarchy (SDH) link, and the sections include virtual tributaries of the frames received on the link. In a preferred embodiment, encapsulating the user data includes inserting in the packets pointer movement indications, indicating timing difference between the received data in the input signal and a reference timing signal, to be applied in generating an output sequence of the frames of the data for transmission over a second circuit without changing pointers of the virtual tributaries pointers relative to the frames in the output sequence. Alternatively, encapsulating the user data includes inserting in the packets pointer movement indications, indicating timing differences between the received data in the input signal and a reference timing signal, to be applied to virtual path level pointers of the active sections in generating an output sequence of the frames of the data for transmission over a second circuit. Further alternatively, encapsulating the user data includes adjusting virtual tributary pointers at the first circuit relative to frame pointers of the input signal and a reference timing signal, and encapsulating the user data includes generating the packets according to the reference timing signal, thereby obviating further adjustments of the pointers in generating an output sequence of the frames of the data for transmission over a second circuit.

In another preferred embodiment, receiving the TDM input signal includes inserting the data from at least one of a DS1 signal and an E1 signal into one or more of the active sections in the input sequence of the frames. Preferably, encapsulating the user data includes adjusting virtual tributary pointers at the first circuit relative to a reference timing signal, and encapsulating the user data includes generating the packets according to the reference timing signal, thereby obviating further adjustments of the pointers in generating an output sequence of the frames of the data for transmission over a second circuit.

Preferably, the inactive sections include default data and are marked as unequipped sections. Additionally or alternatively, the inactive sections are configured such that the data in the inactive sections is not to be sent over the packet network.

In a preferred embodiment, encapsulating the user data includes adding a label to the packets for transmission over the packet network. Preferably, encapsulating the packets includes sending the packets over the packet network through a Multi-protocol Label-Switched (MPLS) tunnel, and adding the label includes preparing the label for transmission of the packets using circuit emulation over MPLS. Additionally or alternatively, the packet network includes an Internet Protocol (IP) network, and wherein adding the label includes preparing the label for transmission of the packets using circuit emulation over a Multi-protocol Label-Switched (MPLS) path through the IP network.

There is also provided, in accordance with a preferred embodiment of the present invention, a method for applying a circuit emulation service (CES) to a Synchronous Optical Network (SONET) input signal that includes a plurality of input virtual tributaries containing data, the method including:

determining which of the input virtual tributaries in the SONET input signal are active, such that the data in the active virtual tributaries include user data;

receiving the SONET input signal at a CES transmitter on a first SONET link;

encapsulating the user data in the active virtual tributaries of the SONET input signal into data packets at the CES transmitter, while omitting from the packets at least some of the data from the inactive virtual tributaries;

transmitting the packets over a packet network from the CES transmitter to a CES receiver;

extracting the user data from the packets at the CES receiver; and generating a SONET output signal including output virtual tributaries at the CES receiver by inserting the extracted user data from each of the active virtual tributaries into a corresponding one of the output virtual tributaries.

Preferably, generating the SONET output signal includes inserting default data into the output virtual tributaries that do not correspond to the active virtual tributaries of the SONET input signal.

Further preferably, generating the SONET output signal includes inserting the extracted user data from each of the active virtual tributaries into the same one of the output virtual tributaries. Alternatively, generating the SONET output signal includes inserting the extracted user data from at least one of the active virtual tributaries into a different one of the output virtual tributaries, so as to cross-connect the virtual tributaries.

Preferably, encapsulating the user data includes inserting SONET pointer adjustment data into the packets, and generating the SONET output signal includes adjusting the user data in at least one of the output virtual tributaries responsive to the pointer adjustment data. In a preferred embodiment, adjusting the user data includes applying different pointer adjustments to different ones of the virtual tributaries.

In a further preferred embodiment, encapsulating the user data includes adding a label to the packets, and transmitting the packets includes conveying the packets via a label-switched tunnel through the packet network. Preferably, the label-switched tunnel includes a Multi-protocol Label-Switched (MPLS) tunnel, and adding the label includes prepending information to the data for transmission of the packets using circuit emulation over MPLS.

There is additionally provided, in accordance with a preferred embodiment of the present invention, apparatus for data communications, including:

a circuit interface, coupled to receive a time-division-multiplexed (TDM) input signal on a first circuit, the signal including an input sequence of frames of data, each such frame divided into sections for carrying respective sub-rate payloads; and a packet network interface, adapted to receive an indication of which of the sections are active, such that the data in the sub-rate payloads of the active sections include user data, and which of the sections are inactive, and responsive to the indication, to encapsulate the user data in the active sections into data packets for transmission over a packet network, while omitting from the packets at least some of the data from the inactive sections.

Preferably, the apparatus includes a data receiver, adapted to receive the packets over the packet network and to extract the user data from the packets so as to generate an output sequence of the frames of the data for transmission in a TDM output signal over a second circuit, by inserting the extracted user data in selected sections among the sections of the frames in the output sequence.

There is further provided, in accordance with a preferred embodiment of the present invention, apparatus for applying a circuit emulation service (CES) to a Synchronous Optical Network (SONET) input signal that includes a plurality of input virtual tributaries containing data, the apparatus including:

a transmitter, adapted to receive an indication of which of the input virtual tributaries in the SONET input signal are active, such that the data in the active virtual tributaries include user data, and coupled to receive the SONET input signal on a first SONET link, to encapsulate the user data in the active virtual tributaries of the SONET input signal into data packets at the CES transmitter, while omitting from the packets at least some of the data from the inactive virtual tributaries, and to transmit the packets over a packet network; and a receiver, coupled to receive the packets over the packet network, and adapted to extract the user data from the packets at the CES receiver and to generate a SONET output signal including output virtual tributaries at the CES receiver by inserting the extracted user data from each of the active virtual tributaries into a corresponding one of the output virtual tributaries.

The present invention will be more fully understood from the following detailed description of the preferred embodiments thereof, taken together with the drawings in which:

DETAILED DESCRIPTION OF PREFERRED EMBODIMENTS

Figure 1:
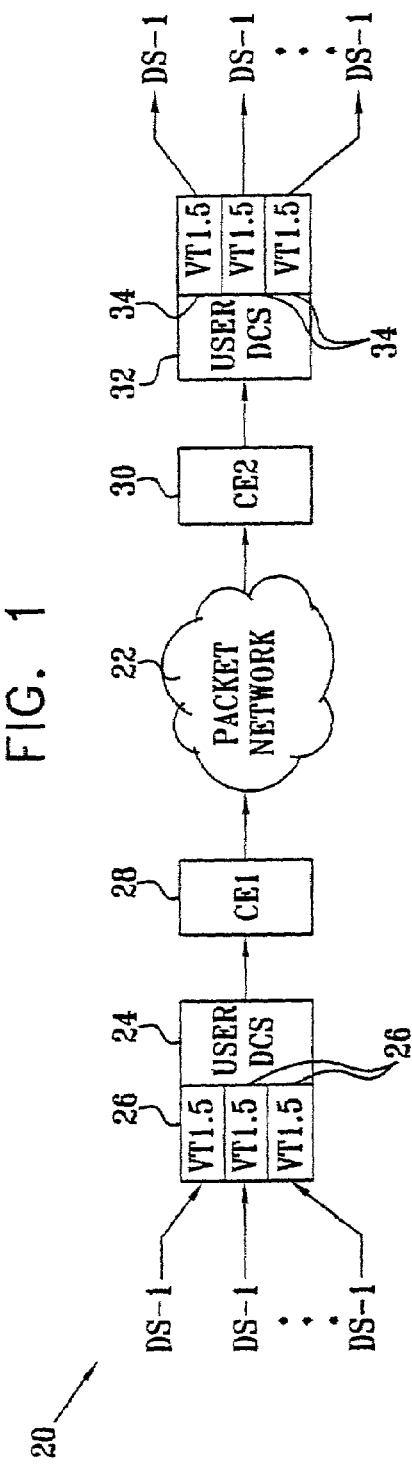
FIG. 1 is a block diagram that schematically illustrates a circuit emulation system, in accordance with a preferred embodiment of the present invention.

FIG. 1 is a block diagram that schematically illustrates a system 20 for transport of SONET signals over a packet network 22 by CES, in accordance with a preferred embodiment of the present invention. An input user digital cross-connect system (DCS) 24 receives multiple DS-1 subscriber signals, and multiplexes the signals in VT1.5 sections 26 of STS-1 frames in a SONET OC-N input signal, as is known in the art. A circuit emulation (CE) transmitter 28, labeled CE1, extracts the STS-1 frames from the OC-N signal and packetizes the payload data contained in the frames for transmission over network 22. Although in FIG. 1 the OC-N signal is directly connected to CE1, other ways of conveying the SPE to be compressed, as described below, to CE1 through a SONET network will be apparent to those skilled in the art. Packet network 22 may provide substantially any suitable type of packet transport known in the art, such as IP and/or MPLS. The data packets generated by CE1 are preferably transmitted across network 22 as described in the Background of the Invention.

CE1 determines which of VT1.5 sections 26 are active, i.e., which sections are actually carrying subscriber data, and which are unequipped and contain only default data. CE1 is preferably informed of the active sections by a network management function, or alternatively detects the active and inactive sections automatically. Accordingly, CE1 packetizes and transmits the subscriber data, while discarding at least some of the default data, in order to conserve bandwidth on network 22. A CE receiver 30, labeled CE2, receives the CES packets from CE1 and reconstitutes the STS-1 frames to generate a SONET OC-N output signal with VT1.5 sections 34 corresponding to sections 26 of the input signal. Optionally, CE2 places the VT1.5 sub-rate payload data in different locations in the output frames from those of the input signal, in order to apply a virtual crossconnect function to the DS-1 subscriber signals. CE2 may also accept and combine payload data from multiple sources. Likewise, CE1 may send data from different VT1.5 sections of the same original SPE to multiple destinations. An output DCS 32 receives the OC-N signal from CE2 and demultiplexes the DS-1 subscriber signals among the appropriate subscriber lines.

As a further alternative, CE1 and/or CE2 may be coupled directly to the DS-1 input lines and/or DS-1 output lines, respectively, without the intervening user DCS. In this case, CE-1 and/or CE-2 carries out the functions of multiplexing/demultiplexing the DS-1 data in the appropriate sections of the SPE, as well as performing the timing adjustments described hereinbelow.

For the sake of convenience and clarity of explanation, preferred embodiments described herein refer mainly to CES packetization of VT1.5 sections in a SONET signal, and to transportation of the resultant packets from CE1 to CE2 through MPLS tunnels in IP network 22. It is a simple matter to extend these embodiments to other types and sizes of sub-rate payload sections, following SONET (VT2 and VT6, for example), SDH (lower-order paths such as VC-2, VC-12 and VC-11, for example) and other framing protocols. Similarly, although MPLS provides a useful means for transporting large volumes of data rapidly through packet networks, CE1 and CE2 may similarly exchange data over packet channels and networks of other types, as are known in the art. Typically, SONET CES is bi-directional, and CE1 and CE2 both send and receive OC-N signals and CES packet data. For simplicity in the explanation that follows, however, CE1 is referred to as the transmitter and CE2 as the receiver, and only the single communication direction, from CE1 to CE2, is shown and described.

Figure 2:
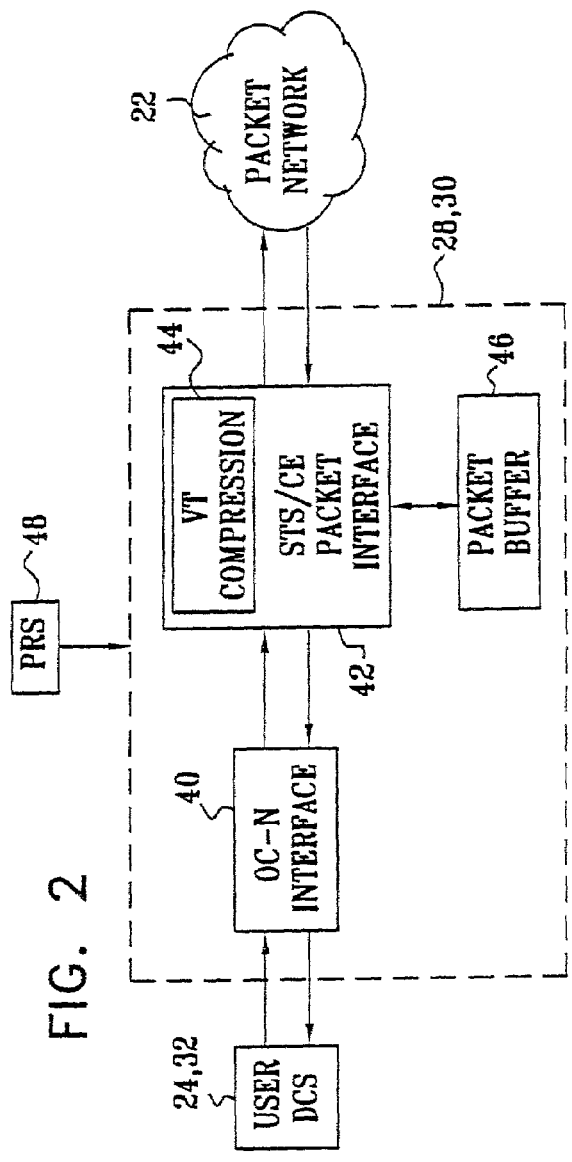
FIG. 2 is a block diagram that schematically shows details of a circuit emulation device used in the system of FIG. 1, in accordance with a preferred embodiment of the present invention.

FIG. 2 is a block diagram that schematically shows details of CE transmitter 28 and receiver 30, in accordance with a preferred embodiment of the present invention. A SONET interface 40 terminates the incoming OC-N signal, and feeds the STS-1 frame data to a packet interface 42. Alternatively or additionally, the transmitter and/or receiver may comprise multiple interfaces at rates below OC-1 (such as DS-1 or DS-2 interfaces) for receiving the lower-rate input data directly, without the intervening user DCS. As noted above, a VT compression block 44 is informed of or automatically detects which VT sections of the STS-1 frames are active, and which contain default data. Interface 42 discards the TOH of the incoming frames, while using the pointer bytes in the TOH to locate the beginning of the POH in the SPE. Block 44 instructs interface 42 to select the data from the active columns of the SPE, while discarding the default data. Interface 42 adds an appropriate CES header to the selected data, and encapsulates the data with the header in packets for transmission over network 22. Further details of the packet structure are described hereinbelow.

At the receiver, incoming CES packets are de-encapsulated and are held in a packet buffer 46 to the extent necessary to compensate for delay variations in the packet stream. Based on information provided by VT compression block 44, packet interface 42 reconstitutes the STS-1 frames at the appropriate fixed clock rate. A primary reference source (PRS) 48, as is known in the SONET art, is used to synchronize the clocks of transmitter 28 and receiver 30 for purposes of pointer adjustments. The PRS is similarly used to adjust the timing of the individual VT1.5 sections and the SPEs of the SONET signals, as described further hereinbelow. OC-N interface 40 incorporates the reconstituted frames in an output OC-N SONET signal to DCS 32.

Figure 3:
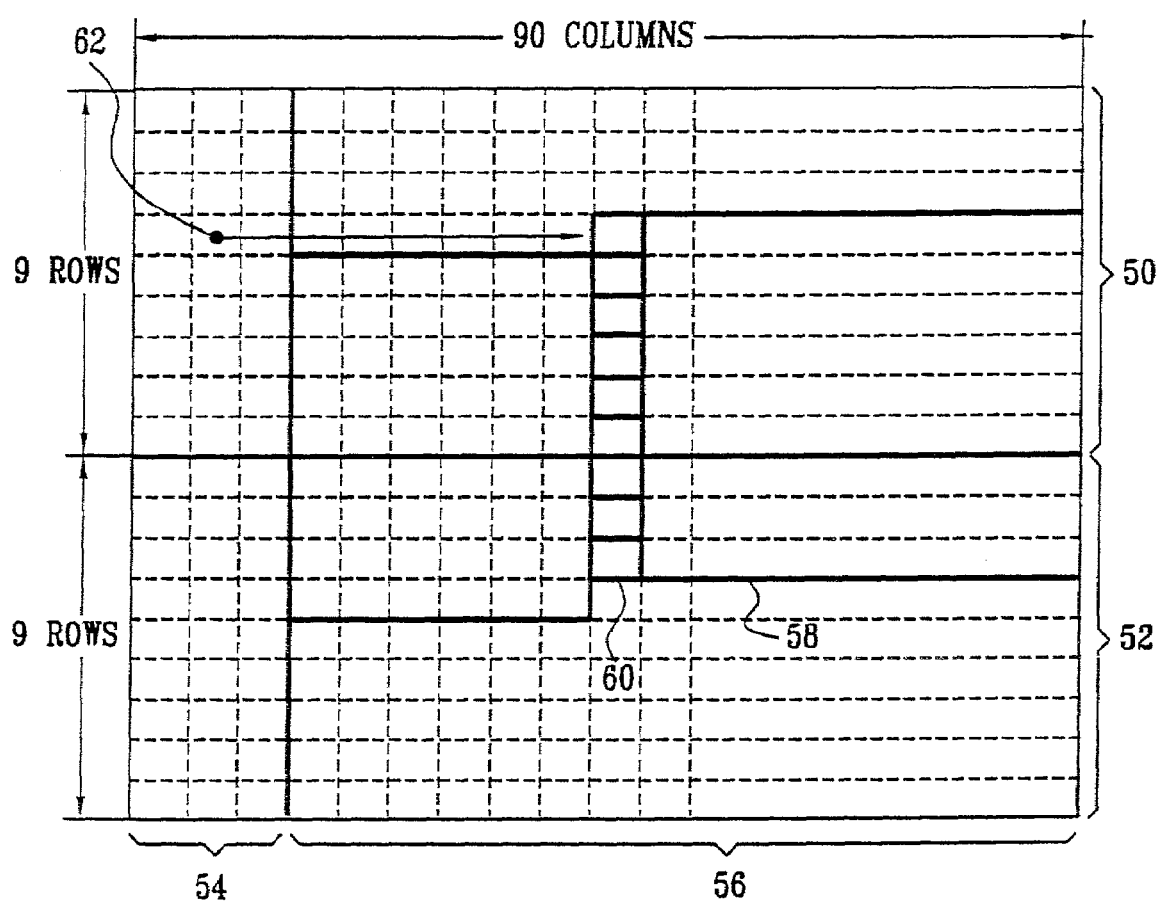
FIG. 3 is a block diagram that schematically illustrates the structure of SONET STS-1 frames, as is known in the art.

FIG. 3 is a block diagram that schematically illustrates the structure of SONET STS-1 frames 50, 52, as an aid in understanding the present invention. Each frame comprises three columns of transport overhead (TOH) 54, followed by 87 columns of payload 56. The payload contains a SPE 58, which begins with one column of path overhead (POH) 60. As shown in the figure, the SPE is typically not aligned with the frame boundaries and can start at any byte in payload 56. A pointer 62, consisting of the H1 and H2 bytes in the fourth row of TOH 54, indicates the offset of the J1 byte at the beginning of POH 60. The H3 byte (also in the fourth row of the TOH) is used for byte stuffing when needed for the purpose of pointer adjustment, as is known in the SONET art.

Figure 4:
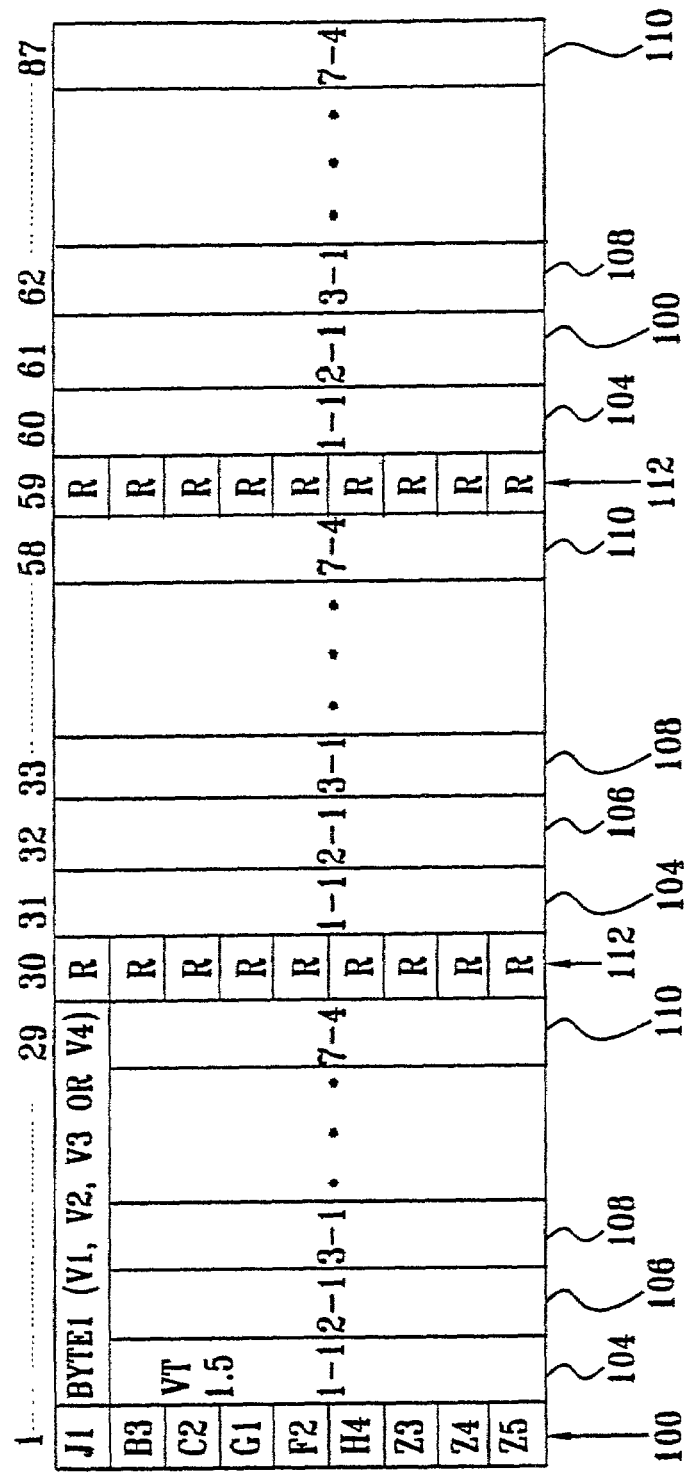
FIG. 4 is a block diagram that schematically illustrates division of a SONET SPE into VT1.5 virtual tributaries, as in known in the art.

FIG. 4 is a block diagram that schematically illustrates the division of SPE 58 into VT1.5 sections 104, 106, 108, . . . , 110, as described in the above-mentioned Telcordia publication GR-253-CORE (section 3.2.4). SPE here begins with POH 100 (typically identical to POH 60 shown in FIG. 3, but relabeled here to avoid confusion). Each section comprises three columns of the SPE, spaced 29 columns apart. Thus, section 104 (labeled 1-1) occupies columns 2, 31 and 60; section 106 (labeled 2-1) occupies columns 3, 32 and 61; and so forth, up to section 110 (labeled 7-4), in columns 29, 58 and 87. The three sequences of VT1.5 columns are separated by unused, reserved columns 112. The VT sub-rate payloads are typically not aligned with the boundaries of SPE 58. Therefore, the first byte in each of sections 104, 106, 108, . . . , 110 contains pointers (V1, V2, V3, V4), which indicate the beginning byte of the respective VT payload and provide for byte stuffing when needed, like the H1, H2 and H3 bytes in TOH 54. The first byte in each section pointed to by V1 and V2 is the V5 byte (not shown in the figures). V5 contains three bits that indicate the signal label, with "000" indicating an unequipped section. Values "101", "110" and "111" are unassigned. Further details of the signal label are provided in section 3.3.3 of the above-mentioned GR-253-CORE publication.

Figure 5:
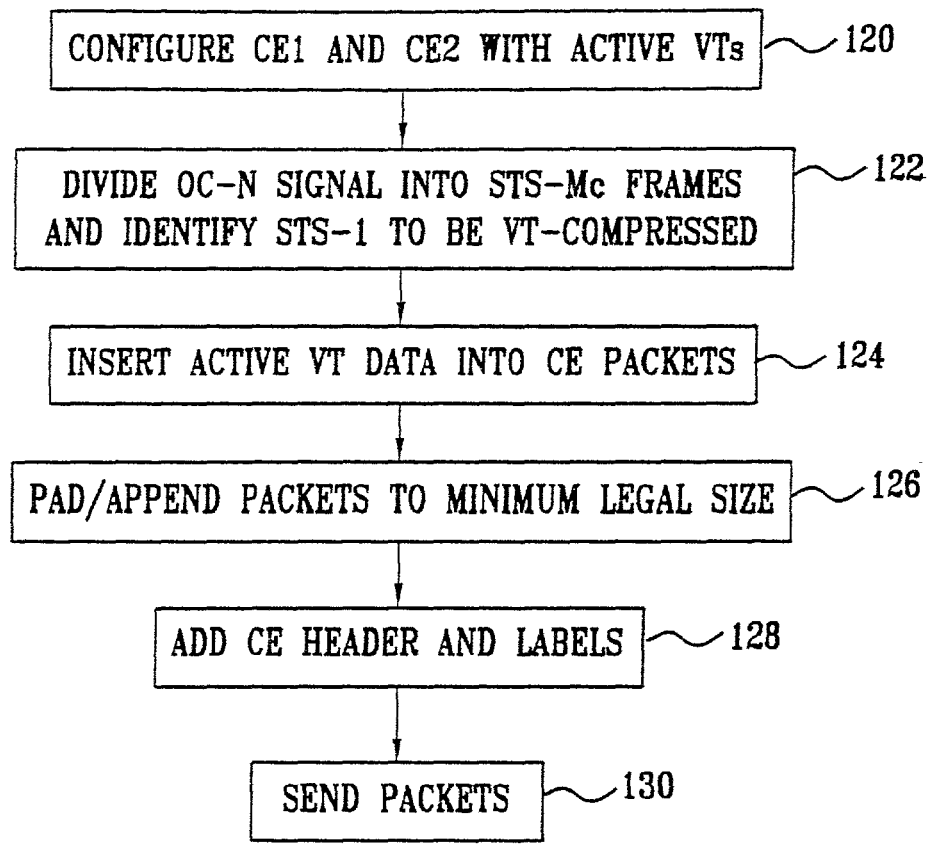
FIG. 5 is a flow chart that schematically illustrates a method for packetizing a SONET signal for circuit emulation, in accordance with a preferred embodiment of the present invention.

FIG. 5 is a flow chart that schematically illustrates a method for CES transmission of SONET data over network 22, in accordance with a preferred embodiment of the present invention. The method includes VT compression of the SONET signal received by CES transmitter 28 from DCS 24. Before beginning CES, transmitter 28 (CE1) and receiver 30 (CE2) are configured with the identities of the active VT sections in the OC-N signal, at a configuration step 120. This configuration step can be performed in response to management signaling or done automatically based on monitoring of the incoming VT1.5 signal labels, and identifying unequipped or unassigned signal labels in the VT POH. As part of the configuration stage, CE1 and CE2 set up the SONET CES path between them through the appropriate MPLS tunnels in network 22 and configure the required service parameters. Preferably, for this purpose, CE1 and CE2 use methods of signaling described in a U.S. patent application entitled, "Efficient Setup of Label-Switched Connections," filed Aug. 23, 2001, which is assigned to the assignee of the present patent application and whose disclosure is incorporated herein by reference. Most preferably, these methods are also used to tell CE2 which VTs are active, as well as to specify the path information to put into the outgoing STS-1 frames that it prepares.

CE1 receives the OC-N signal and divides it into STS-Mc frames, at a frame separation step 122. Some of the STS-Mc signals are typically transferred as is, preferably using the procedure proposed by Malis et al., as described in the Background of the Invention. Only STS-1 frames that carry unequipped or unassigned VT1.5 sections are subject to the compression methods described herein. These STS-1 frames are identified at step 122 based on the configuration determined at step 120. For these frames, CE1 extracts SPE 58 from the STS-1 frame sequence, and identifies the columns belonging to the active VT sections. CE1 inserts the data from these columns into CES packets, at a data insertion step 124. Preferably, POH 100 is included in the packets and transmitted transparently, as well. Alternatively, the SONET path is terminated at CE1, and POH 100 is not packetized, but is rather regenerated at CE2.

Thus, for example, if only VT sections 104 (1-1), 106 (2-1) and 108 (3-1) were active, then CE1 would send only the contents of columns 1–4, 31–33, and 60–62 in each SPE 58 (assuming POH 100 is to be transmitted). The default data in the remaining columns of the SPE are discarded. In other words, in this example, CE1 packetizes only 90 bytes out of the entire SPE, as opposed to sending all 783 bytes as in CES methods known in the art.

In some packet networks, there is a minimum permitted packet size, and the CES packets generated by CE1 may be shorter than this limit if there are only a few active VTs in the STS-1 frames. Therefore, CE1 optionally pads the packets with default data, typically taken from inactive VT sections, up to the minimum packet length, at a padding step 126. Alternatively, CE1 may append together the payloads of two or more packets, as sub-payloads in a single packet. The number of packets to be appended is preferably configured in advance or signaled as part of the service configuration at step 120.

After extracting and, if necessary, padding or appending the packet payload, CE1 prepends to each packet a special CES header, along with MPLS labels and other header information, at a header generation step 128. The packets are then transmitted over network 22 to CE2, at a sending step 130.

Figure 6:
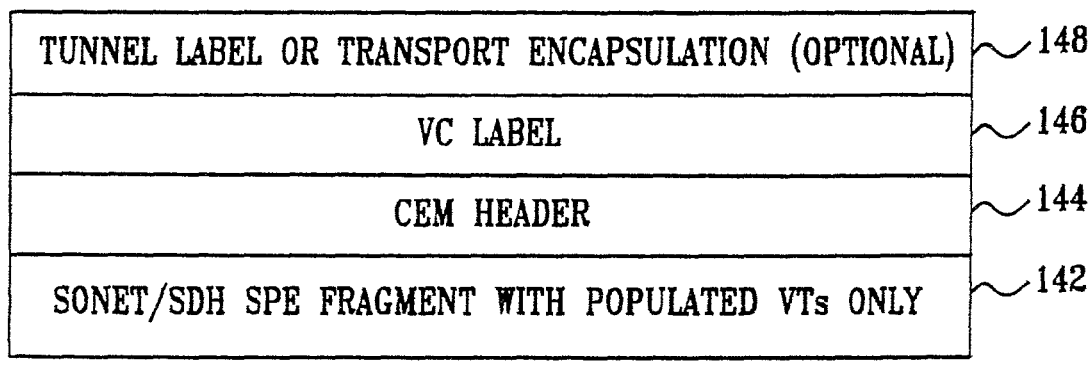
FIG. 6 is a block diagram that schematically illustrates the structure of a circuit emulation packet, in accordance with a preferred embodiment of the present invention.

FIG. 6 is a block diagram that schematically illustrates the structure of a CE packet 140 generated by CE1 at step 128, in accordance with a preferred embodiment of the present invention. Packet 140 is of the general form prescribed by Malis et al., in the above-mentioned IETF draft regarding CEM encapsulation. As shown in FIG. 6, however, a packet payload 142 of packet 140 contains only the data from active (populated) VT sections of SPE 58, rather than the entire SPE. A CEM header 144 and a VC label 146 are added to the payload, in substantially the manner described by Malis et al. When multiple sub-payloads are appended to bring the packet up to a certain minimum size, as described above at step 126, each of the sub-payloads preferably keeps its own CEM header, but the VC label is shared. An optional tunnel or transport encapsulation label 148 is added to the packet, as is known in the MPLS art.

Figure 7:
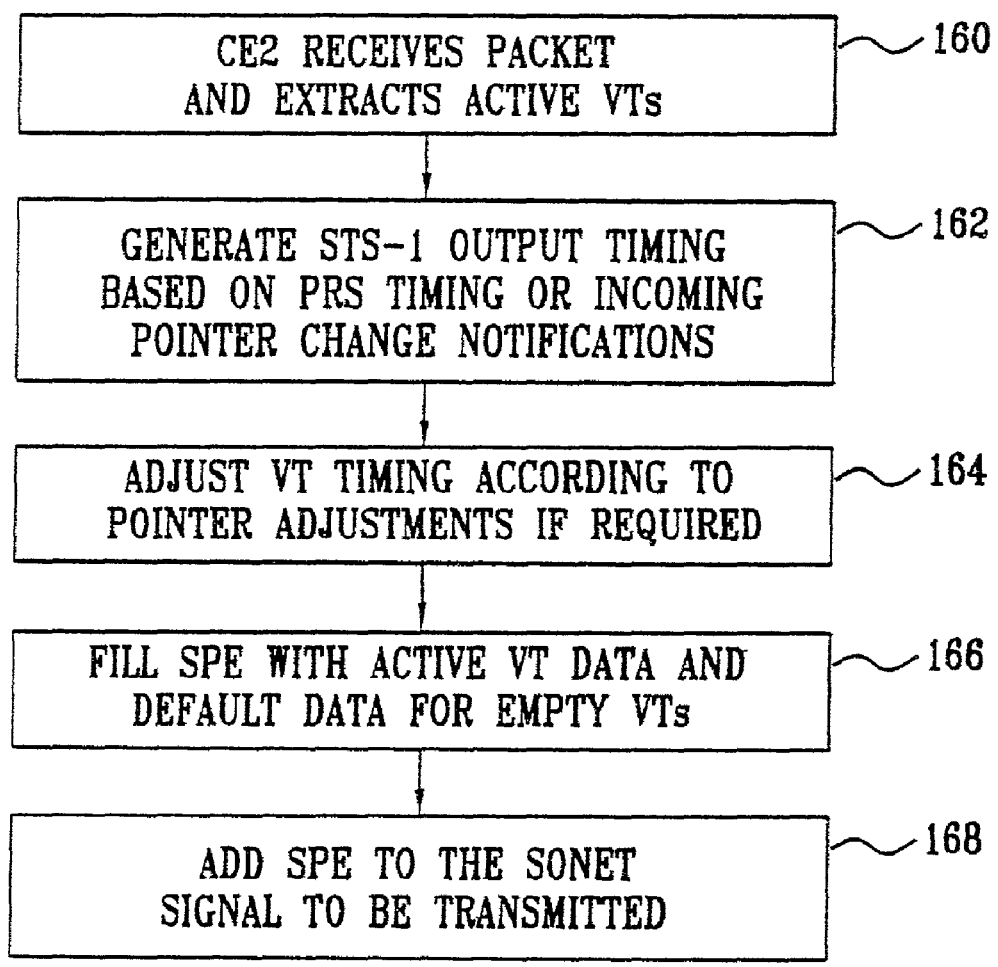
FIG. 7 is a flow chart that schematically illustrates a method for reconstructing a SONET signal from a stream of circuit emulation packets, in accordance with a preferred embodiment of the present invention.

FIG. 7 is a flow chart that schematically illustrates a method for regenerating the SONET STS-1 signal at receiver 30 (CE2), in accordance with a preferred embodiment of the present invention. After setting up and configuring the CES, as described above, CE2 receives packets from CE1, at a packet reception step 160. CE2 uses VC label 146 and CEM header 144 to identify the service to which the packets belong and to locate the SONET payload data in the packets. Assuming that these are packets to which VT compression has been applied, the payload data typically belongs only to the active VT sections. Alternatively, to the extent that the packets have been padded at step 126, CE2 recognizes and discards the default fill data that have been added. The data from the active VT sections are buffered as necessary, in buffer 46, whose depth typically depends on the jitter of the channel between CE1 and CE2 via network 22.

CE2 generates the appropriate timing to reconstitute the STS-1 frames for the output OC-N signal, at a timing generation step 162. Preferably, both CE1 and CE2 are synchronized to the same PRS clock 48 (FIG. 2), so that the frequency of the output STS-1 frames can be regenerated to be equal to that of the input STS-1 frames. The pointer information recorded in CEM header 104 at CE1 is used to define the beginning of POH 100 in each new SPE in the packet payload data at CE2. Pointer adjustments indicated by the N and P bits in the CEM header are also implemented at CE2, in a pointer adjustment step 164. It may be necessary to change the V1, V2 and V3 pointers (FIG. 4) in the active VT sections in order to adjust the timing of the sections relative to the SPE as a whole in cases in which it is not possible to move the output SPE based on the pointer indications in CEM header 144.

In some cases, especially when the VTs inside the SPE at CE2 come from multiple sources, it may be necessary for CE2 to generate the STS-1 signal based on PRS timing provided by PRS 48, i.e., with fixed pointers, assuming the timing of the OC-N signal is also based on the PRS. In this case it is required to adjust the VT sections pointers individually. When the CES receiver gets VT1.5 payloads from multiple CES transmitters for inclusion in the same STS-1 output signal, the output SPE timing cannot simply be adjusted for the input SPE pointer movement as indicated in the received packet, since there may be phase differences between the different input sources. To deal with this case, CE2 preferably generates its own STS-1 output timing and performs pointer adjustments on the individual VT1.5 payloads. For example, if a positive adjustment was signaled by the H1 and H2 pointer bytes of TOH 54 in one of the input frames, CE1 will have indicated the adjustment in the P and N bits of CEM header 144 carried by the CEM packet. CE2 applies the adjustment to the V1 and V2 pointer bytes of the corresponding VT, instead of adjusting the timing of the entire SPE as described by Malis et al.

Alternatively or additionally, CE1 may adjust the VT pointers in advance, based on PRS 48, before transmitting the packet. In this case, no path-level pointer adjustments are required in the CES packets, and CE2 can multiplex the VT1.5 sections directly into the output STS-1 frames without individual VT adjustments, as long as the packets are transmitted based on PRS 48, and the output SPE timing is also based on the PRS. This alternative is more complex to implement at CE1, but clearly simpler at CE2. Furthermore, even if CE2 has its own VT pointer adjustment capability, as described above, it can still accept packets with pre-adjusted pointers from CE1.

Further alternatively or additionally, if it is known in advance that the DS-1 lines associated with a given VT1.5 section in both DCS 24 and DCS 32 are synchronized via some external means, CE2 may re-construct the required VT1.5 pointer adjustments based on the relative pointer adjustment indicated by the signal coming from DCS 32 to CE2 30, compared to the PRS signal.

After adjusting the timing as required, CE2 inserts the data extracted from the CES packet payloads into the appropriate columns of the output SPE, at a data insertion step 166. The columns are those that belong to the active VT sections of the STS-1 output frames. These active output sections are typically the same as the active sections of the input frames for transparent CES, but they may be different from the active VT sections of the input frames if CE2 is being used to implement a virtual cross-connection. The remaining columns, belonging to the inactive VT sections, are filled with default data. The bit-interleaved parity (BIP) error detection code in byte B3 of POH 100 is recalculated for the output SPE. The STS-1 frames thus constructed are then assembled into the required OC-N signal with other STS-Mc frames, and are transmitted over the output OC-N link to DCS 32, at a frame transmission step 168.

As noted above, although preferred embodiments are described herein with reference to certain network types and protocols, the principles of the present invention may similarly be applied to packetized transportation of TDM payloads of substantially any type. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data communications, comprising:
receiving a time-division-multiplexed (TDM) input signal on a first circuit, the signal comprising an input sequence of frames of data, each such frame divided into sections for carrying respective subrate payloads, wherein the first circuit comprises one of a Synchronous Optical Network (SONET) link and a Synchronous Digital Hierarchy (SDH) link, and wherein the sections comprise virtual tributaries of the frames received on the link;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections.

2. A method according to claim 1, and comprising:
receiving the packets over the packet network;
extracting the user data from the packets; and
generating an output sequence of the frames of the data for transmission in a TDM output signal over a second circuit, by inserting the extracted user data in selected sections among the sections of the frames in the output sequence.

3. A method according to claim 2, wherein generating the output sequence comprises providing a circuit emulation service over the packet network, whereby the user data are transmitted between the first and second circuits in a manner transparent to a sender and a recipient of the data.

4. A method according to claim 2, wherein the selected sections of the frames in the output sequence are substantially the same sections as the active sections of the frames in the input sequence.

5. A method according to claim 2, wherein generating the output sequence of the frames comprises sending a plurality of output signals containing the data from different ones of the active sections to different, respective destinations.

6. A method according to claim 1, wherein encapsulating the user data comprises inserting in the packets pointer movement indications, indicating timing difference between the received data in the input signal and a reference timing signal, to be applied in generating an output sequence of the frames of the data for transmission over a second circuit without changing pointers of the virtual tributaries pointers relative to the frames in the output sequence.

7. A method according to claim 1, wherein encapsulating the user data comprises inserting in the packets pointer movement indications, indicating timing differences between the received data in the input signal and a reference timing signal, to be applied to virtual path level pointers of the active sections in generating an output sequence of the frames of the data for transmission over a second circuit.

8. A method according to claim 1, wherein encapsulating the user data comprises adjusting virtual tributary pointers at the first circuit relative to frame pointers of the input signal and a reference timing signal, and wherein encapsulating the user data comprises generating the packets according to the reference timing signal, thereby obviating further adjustments of the pointers in generating an output sequence of the frames of the data for transmission over a second circuit.

9. A method according to claim 1, wherein receiving the TDM input signal comprises inserting the data from at least one of a DS1 signal and an E1 signal into one or more of the active sections in the input sequence of the frames.

10. A method according to claim 1, wherein the inactive sections are configured such that the data in the inactive sections is not to be sent over the packet network.

11. A method according to claim 1, wherein encapsulating the user data comprises adding a label to the packets for transmission over the packet network.

12. A method for data communications, comprising:
receiving a time-division-multiplexed (TDM) input signal on a first circuit, the signal comprising an input sequence of frames of data, each such frame divided into sections for carrying respective subrate payloads;
determining which of the sections are active, such that the data in the sub-rate payloads of the active sections comprise user data, and which of the sections are inactive;
encapsulating the user data in the active sections into data packets for transmission over a packet network, while omitting from the packets at least some of the data from the inactive sections;
receiving the packets over the packet network;
extracting the user data from the packets; and
generating an output sequence of the frames of the data for transmission in a TDM output signal over a second circuit, by inserting the extracted user data in selected sections among the sections of the frames in the output sequence,
wherein the inactive sections comprise default data, and wherein generating the output sequence of the frames comprises inserting the default data in the sections of the frames in the output sequence that are not selected, whereby the sections that are not selected correspond in form to unequipped sections.

13. A method for data communications, comprising:
receiving a time-division-multiplexed (TDM) input signal on a first circuit, the signal comprising an input sequence of frames of data, each such frame divided into sections for carrying respective sub-rate payloads;
determining which of the sections are active, such that the data in the sub-rate payloads of the active sections comprise user data, and which of the sections are inactive;
encapsulating the user data in the active sections into data packets for transmission over a packet network, while omitting from the packets at least some of the data from the inactive sections;

receiving the packets over the packet network;
extracting the user data from the packets; and
generating an output sequence of the frames of the data for transmission in a TDM output signal over a second circuit, by inserting the extracted user data in selected sections among the sections of the frames in the output sequence,
wherein generating the output sequence of the frames comprises assigning at least one of the selected sections of the frames in the output sequence to correspond to at least one of the active sections of the frames in the input sequence, and transferring the user data from the at least one of the active sections to the at least one of the selected sections that corresponds thereto, so as to cross-connect a source link in the first circuit to a recipient link in the second circuit.

14. A method according to claim 13, wherein receiving the TDM input signal comprises assembling the sections of the frames of the input signal from multiple sources.

15. A method for data communications, comprising:
receiving a time-division-multiplexed (TDM) input signal on a first circuit, the signal comprising an input sequence of frames of data, each such frame divided into sections for carrying respective sub-rate payloads;
determining which of the sections are active, such that the data in the sub-rate payloads of the active sections comprise user data, and which of the sections are inactive;
encapsulating the user data in the active sections into data packets for transmission over a packet network, while omitting from the packets at least some of the data from the inactive sections;
receiving the packets over the packet network;
extracting the user data from the packets; and
generating an output sequence of the frames of the data for transmission in a TDM output signal over a second circuit, by inserting the extracted user data in selected sections among the sections of the frames in the output sequence,
wherein encapsulating the user data comprises inserting into the packets an indication of a timing adjustment to be applied to one or more of the active sections, and wherein generating the output sequence of the frames comprises adjusting the user data in at least one of the selected sections responsive to the indication.

16. A method according to claim 15, wherein adjusting the user data comprises applying different timing adjustments to different ones of the selected sections.

17. A method for data communications, comprising:
receiving a time-division-multiplexed (TDM) input signal on a first circuit, the signal comprising an input sequence of frames of data, each such frame divided into sections for carrying respective sub-rate payloads;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections,
wherein receiving the TDM input signal comprises inserting the data from at least one of a DS1 signal and an E1 signal into one or more of the active sections in the input sequence of the frames, and
wherein encapsulating the user data comprises adjusting virtual tributary pointers at the first circuit relative to a reference timing signal, and wherein encapsulating the user data comprises generating the packets according to the reference timing signal, thereby obviating further adjustments of the pointers in generating an output sequence of the frames of the data for transmission over a second circuit.

18. A method for data communications, comprising:
receiving a time-division-multiplexed (TDM) input signal on a first circuit, the signal comprising an input sequence of frames of data, each such frame divided into sections for carrying respective subrate payloads;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections, wherein the inactive sections comprise default data.

19. A method for data communications, comprising:
receiving a time-division-multiplexed (TDM) input signal on a first circuit, the signal comprising an input sequence of frames of data, each such frame divided into sections for carrying respective subrate payloads;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections, wherein the inactive sections are marked as unequipped sections.

20. A method for data communications, comprising:
receiving a time-division-multiplexed (TDM) input signal on a first circuit, the signal comprising an input sequence of frames of data, each such frame divided into sections for carrying respective sub-rate payloads;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections,
wherein encapsulating the user data comprises adding a label to the packets for transmission of the packets over the packet network through a Multi-protocol Label-Switched (MPLS) tunnel, and wherein adding the label comprises preparing the label for transmission of the packets using circuit emulation over MPLS.

21. A method for data communications, comprising:
receiving a time-division-multiplexed (TDM) input signal on a first circuit, the signal comprising an input sequence of frames of data, each such frame divided into sections for carrying respective sub-rate payloads;
determining which of the sections are active, such that the data in the sub-rate payloads of the active sections comprise user data, and which of the sections are inactive; and
encapsulating the user data in the active sections into data packets for transmission over a packet network, while omitting from the packets at least some of the data from the inactive sections, wherein encapsulating the user data comprises adding a label to the packets for transmission over the packet network, and wherein the packet network comprises an Internet Protocol (IP) network, and wherein adding the label comprises preparing the label for transmission of the packets as IP packets using circuit emulation over a Multi-protocol Label-Switched (MPLS) path through the IP network.

22. A method for applying a circuit emulation service (CES) to a Synchronous Optical Network (SONET) input signal that includes a plurality of input virtual tributaries containing data, the method comprising:

determining which of the input virtual tributaries in the SONET input signal are active, such that the data in the active virtual tributaries comprise user data;

receiving the SONET input signal at a CES transmitter on a first SONET link;

encapsulating the user data in the active virtual tributaries of the SONET input signal into data packets at the CES transmitter, while omitting from the packets at least some of the data from the inactive virtual tributaries;

transmitting the packets over a packet network from the CES transmitter to a CES receiver;

extracting the user data from the packets at the CES receiver; and generating a SONET output signal comprising output virtual tributaries at the CES receiver by inserting the extracted user data from each of the active virtual tributaries into a corresponding one of the output virtual tributaries.

23. A method according to claim 22, wherein generating the SONET output signal comprises inserting default data into the output virtual tributaries that do not correspond to the active virtual tributaries of the SONET input signal.

24. A method according to claim 22, wherein generating the SONET output signal comprises inserting the extracted user data from each of the active virtual tributaries into the same one of the output virtual tributaries.

25. A method according to claim 22, wherein generating the SONET output signal comprises inserting the extracted user data from at least one of the active virtual tributaries into a different one of the output virtual tributaries, so as to crossconnect the virtual tributaries.

26. A method according to claim 22, wherein encapsulating the user data comprises inserting SONET pointer adjustment data into the packets, and wherein generating the SONET output signal comprises adjusting the user data in at least one of the output virtual tributaries responsive to the pointer adjustment data.

27. A method according to claim 26, wherein adjusting the user data comprises applying different pointer adjustments to different ones of the virtual tributaries.

28. A method according to claim 22, wherein encapsulating the user data comprises adding a label to the packets, and wherein transmitting the packets comprises conveying the packets via a label-switched tunnel through the packet network.

29. A method according to claim 28, wherein the label-switched tunnel comprises a Multi-protocol Label-Switched (MPLS) tunnel, and wherein adding the label comprises prepending information to the data for transmission of the packets using circuit emulation over MPLS.

30. Apparatus for data communications, comprising:

a circuit interface, coupled to receive a time-division-multiplexed (TDM) input signal on a first circuit, the signal comprising an input sequence of frames of data, each such frame divided into sections for carrying respective sub-rate payloads, wherein the first circuit comprises one of a Synchronous Optical Network (SONET) link and a Synchronous Digital Hierarchy (SDH) link, and wherein the sections comprise virtual tributaries of the frames received on the link; and a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections.

31. Apparatus according to claim 30, and comprising a data receiver, adapted to receive the packets over the packet network and to extract the user data from the packets so as to generate an output sequence of the frames of the data for transmission in a TDM output signal over a second circuit, by inserting the extracted user data in selected sections among the sections of the frames in the output sequence.

32. Apparatus according to claim 31, wherein the packet network interface is adapted to generate the packets so as to provide a circuit emulation service over the packet network, whereby the user data are transmitted between the first and second circuits in a manner transparent to a sender and a recipient of the data.

33. Apparatus according to claim 31, wherein the selected sections of the frames in the output sequence are substantially the same sections as the active sections of the frames in the input sequence.

34. Apparatus according to claim 31, wherein the data receiver is adapted to send a plurality of output signals containing the data from different ones of the active sections to different, respective destinations.

35. Apparatus according to claim 30, wherein the packet network interface is adapted to insert in the packets pointer movement indications, indicating timing difference between the received data in the input signal and a reference timing signal, to be applied in generating an output sequence of the frames of the data for transmission over a second circuit without changing pointers of the virtual tributaries pointers relative to the frames in the output sequence.

36. Apparatus according to claim 30, wherein the packet network interface is adapted to insert in the packets pointer movement indications, indicating timing differences between the received data in the input signal and a reference timing signal, to be applied to virtual path level pointers of the active sections in generating an output sequence of the frames of the data for transmission over a second circuit.

37. Apparatus according to claim 30, wherein the packet network interface is adapted to adjust virtual tributary pointers at the first circuit relative to frame pointers of the input signal and a reference timing signal, and to generate the packets according to the reference timing signal, thereby obviating further adjustments of the pointers in generating an output sequence of the frames of the data for transmission over a second circuit.

38. Apparatus according to claim 30, wherein the circuit interface is adapted to insert the data from at least one of a DS1 signal and an E1 signal into one or more of the active sections in the input sequence of the frames.

39. Apparatus according to claim 30, wherein the inactive sections are configured such that the data in the inactive sections is not to be sent over the packet network.

40. Apparatus according to claim 30, wherein the packet network interface is adapted to add a label to the packets for transmission over the packet network.

41. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate payloads;
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections; and
a data receiver, adapted to receive the packets over the packet network and to extract the user data from the packets so as to generate an output sequence of the frames of the data for transmission in a TDM output signal over a second circuit, by inserting the extracted user data in selected sections among the sections of the frames in the output sequence,
wherein the inactive sections comprise default data, and wherein the data receiver is adapted to insert the default data in the sections of the frames in the output sequence that are not selected.

42. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate payloads;
a packet network interface, adapted to receive an indication of which of the sections are active, such that the data in the subrate payloads of the active sections comprise user data, and which of the sections are inactive, and responsive to the indication, to encapsulate the user data in the active sections into data packets for transmission over a packet network, while omitting from the packets at least some of the data from the inactive sections; and
a data receiver, adapted to receive the packets over the packet network and to extract the user data from the packets so as to generate an output sequence of the frames of the data for transmission in a TDM output signal over a second circuit, by inserting the extracted user data in selected sections among the sections of the frames in the output sequence,
wherein the data receiver is adapted to receive an assignment of at least one of the selected sections of the frames in the output sequence to correspond to at least one of the active sections of the frames in the input sequence, and to transfer the user data from the at least one of the active sections to the at least one of the selected sections that corresponds thereto, so as to cross-connect a source link in the first circuit to a recipient link in the second circuit.

43. Apparatus according to claim 42, wherein the data receiver is adapted to assemble the sections of the frames of the TDM input signal from multiple signal sources.

44. Apparatus for data communications, comprising:
a circuit interface, coupled to receive a time-division-multiplexed (TDM) input signal on a first circuit, the signal comprising an input sequence of frames of data, each such frame divided into sections for carrying respective subrate payloads;
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections; and
a data receiver, adapted to receive the packets over the packet network and to extract the user data from the packets so as to generate an output sequence of the frames of the data for transmission in a TDM output signal over a second circuit, by inserting the extracted user data in selected sections among the sections of the frames in the output sequence,
wherein encapsulating the packet network interface is adapted to insert into the packets an indication of a timing adjustment to be applied to one or more of the active sections, and wherein the data receiver is adapted to adjust the user data in at least one of the selected sections of the TDM output signal responsive to the indication.

45. Apparatus according to claim 44, wherein the data receiver is adapted to apply different timing adjustments to different ones of the selected sections.

46. Apparatus for data communications, comprising:
a circuit interface, coupled to receive a time-division-multiplexed (TDM) input signal on a first circuit, the signal comprising an input sequence of frames of data, each such frame divided into sections for carrying respective subrate payloads; and
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections,
wherein the circuit interface is adapted to insert the data from at least one of a DS1 signal and an E1 signal into one or more of the active sections in the input sequence of the frames, and
wherein the packet network interface is adapted to adjust virtual tributary pointers at the first circuit relative to a reference timing signal, and to generate the packets according to the reference timing signal, thereby obviating further adjustments of the pointers in generating an output sequence of the frames of the data for transmission over a second circuit.

47. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate a loads; and
a packet network interface, adapted to receive an indication of which of the sections are active, such that the data in the subrate payloads of the active sections comprise user data, and which of the sections are inactive, and responsive to the indication, to encapsulate the user data in the active sections into data packets for transmission over a packet network, while omitting from the packets at least some of the data from the inactive sections, wherein the inactive sections comprise default data.

48. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate payloads; and
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections, wherein the inactive sections are marked as unequipped sections.

49. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate payloads; and
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections,
wherein the packet network interface is adapted to add a label to the packets for transmission over the packet network and to send the packets over the packet network through a Multi-protocol Label-Switched (MPLS) tunnel, and wherein the label comprises label data required for transmission of the packets using circuit emulation over MPLS.

50. Apparatus for data communications, comprising:
a circuit interface, coupled to receive a time-division-multiplexed (TDM) input signal on a first circuit, the signal comprising an input sequence of frames of data, each such frame divided into sections for carrying respective sub-rate payloads; and
a packet network interface, adapted to receive an indication of which of the sections are active, such that the data in the sub-rate payloads of the active sections comprise user data, and which of the sections are inactive, and responsive to the indication, to encapsulate the user data in the active sections into data packets for transmission over a packet network, while omitting from the packets at least some of the data from the inactive sections,
wherein the packet network interface is adapted to add a label to the packets for transmission over the packet network, and wherein the packet network comprises an Internet Protocol (IP) network, and the packet network interface is adapted to prepare the label for transmission of the packets using circuit emulation over a Multi-protocol Label-Switched (MPLS) path through the IP network.

51. Apparatus for applying a circuit emulation service (CES) to a Synchronous Optical Network (SONET) input signal that includes a plurality of input virtual tributaries containing data, the apparatus comprising:
a transmitter, adapted to receive an indication of which of the input virtual tributaries in the SONET input signal are active, such that the data in the active virtual tributaries comprise user data, and coupled to receive the SONET input signal on a first SONET link, to encapsulate the user data in the active virtual tributaries of the SONET input signal into data packets at the CES transmitter, while omitting from the packets at least some of the data from the inactive virtual tributaries, and to transmit the packets over a packet network; and
a receiver, coupled to receive the packets over the packet network, and adapted to extract the user data from the packets at the CES receiver and to generate a SONET output signal comprising output virtual tributaries at the CES receiver by inserting the extracted user data from each of the active virtual tributaries into a corresponding one of the output virtual tributaries.

52. Apparatus according to claim 51, wherein the receiver is adapted to generate the SONET output signal by inserting default data into the output virtual tributaries that do not correspond to the active virtual tributaries of the SONET input signal.

53. Apparatus according to claim 51, wherein the receiver is adapted to insert the extracted user data from each of the active virtual tributaries into the same one of the output virtual tributaries.

54. Apparatus according to claim 51, wherein the receiver is adapted to insert the extracted user data from at least one of the active virtual tributaries into a different one of the output virtual tributaries, so as to cross-connect the virtual tributaries.

55. Apparatus according to claim 51, wherein the transmitter is adapted to insert SONET pointer adjustment data into the packets, and wherein the receiver is adapted to generate the SONET output signal by adjusting the user data in at least one of the output virtual tributaries responsive to the pointer adjustment data.

56. Apparatus according to claim 55, wherein the receiver is adapted to apply different pointer adjustments to different ones of the virtual tributaries.

57. Apparatus according to claim 51, wherein the transmitter is adapted to apply a label to the packets so as to convey the packets via a label-switched tunnel through the packet network.

58. Apparatus according to claim 57, wherein the labelswitched tunnel comprises a Multi-protocol Label-Switched (MPLS) tunnel, and wherein the label comprises information prepended to the data for transmission of the packets using circuit emulation over MPLS.

* * * * *